United States Patent [19]

Walker

[11] Patent Number: 4,867,130

[45] Date of Patent: Sep. 19, 1989

[54] BARBECUE APPARATUS

[76] Inventor: Noal F. Walker, 16555 Bar X Rd., Colorado Springs, Colo. 80908

[21] Appl. No.: 308,327

[22] Filed: Feb. 8, 1989

[51] Int. Cl.$^4$ .............................................. A47J 37/00
[52] U.S. Cl. .................................................. 126/25 A
[58] Field of Search .............. 126/25 R, 25 A, 25 AA

[56] References Cited

U.S. PATENT DOCUMENTS 4,541,406 9/1985 DaSambiagio ................... 126/25 A
4,622,945 11/1986 Glitten .............................. 126/25 A Primary Examiner—Carroll B. Dority, Jr.
Attorney, Agent, or Firm—John L. Isaac

[57] ABSTRACT

A barbecue apparatus includes an enclosure for containing a heat source and a mechanism for supporting the enclosure on a surface. A grill assembly including a grate member is disposed over the enclosure, and a grill assembly support device includes a pair of substantially vertical arms extending upwardly from opposite sides of the enclosure. A mechanism operatively interconnects the grate member with the vertical arms to guide movement of the grate member along the length of the arms. A rotatable shaft interconnects the vertical proximate the upper ends thereof, and a linkage arrangement interconnects the shaft and the grill assembly for selectively raising and lowering the grate relative to the enclosure. Finally, a mechanism is provided for tensioning the shaft and linkage arrangement relative to the vertical arms to permit selective positioning of the grate at any position along the vertical arms spaced from the enclosure thereby regulating the amount of heat reaching the grate from the heat source in the enclosure.

28 Claims, 4 Drawing Sheets

BARBECUE APPARATUS

BACKGROUND OF THE INVENTION

1. Field of the Invention

The present invention relates generally to cooking devices and, more particularly, to an outdoor barbecue apparatus. Specifically, the present invention relates to an improved barbecue apparatus having a unique grill lift mechanism.

2. Description of the Prior Art

Outdoor cooking or barbecue devices have been in existence for many years and have taken a wide variety of forms and shapes from fragile portable devices to permanent outdoor barbecue installations. Most of these devices have certain common fundamentals which include a fire pit or container which is adapted to contain wood, charcoal, gas burners or the like as fuel for a heat source. Located above the fire pit is a grill or grate which holds the food to be cooked above the flame. Examples of such general types of barbecue devices include U.S. Pat. No. 3,105,483, No. 3,398,733 and No. 3,943,837. All of these references disclose general barbecue grill devices of the type described above.

One major problem associated with barbecue devices of the past is that the position of the grill relative to the fire pit is generally not adjustable. Thus, the only manner for adjusting the amount of heat to which the cooking food is exposed is by directly cooling or heating the fire within the fire pit itself. A number of devices have been constructed in attempts to overcome this major disadvantage of most barbecue devices. U.S. Pat. No. 2,968,301 discloses an apparatus wherein the fire pit may be raised or lowered utilizing a screw and gear mechanism. Thus, the heat at the grill within the apparatus may be adjusted. Unfortunately, this particular mechanism is very complex and costly to manufacture.

U.S. Pat. No. 4,622,945 discloses a simple device utilized for raising and lowering the grill. In this instance, a single chain wrapped around a rotatable rod is used, and a single vertical arm is used to raise and lower the grill with a gear and stop arrangement provided to maintain the grill at a selected height after it has been raised or lowered. Thus, the height of the grill is limited to certain predetermined locations based on the gear and stop arrangement and may not be fine tuned or finely adjusted depending on the heat being generated from the fire pit.

U.S. Pat. No. 4,462,306 and No. 4,541,406 disclose outdoor barbecue grills having a grill plate which may raised or lowered by the turning of a rod. In these references, a double chain or dual screw-type mechanism is used to raise and lower the grill, one located at each end of the grill proximate the end supports. Ratchet-type of arrangements are utilized by these references to maintain the grill in a desired location, thereby limiting the positioning of the grill to predetermined specific levels based on the ratchet arrangement. Finally, U.S. Pat. No. 4,344,516 discloses a portable grill device which utilizes a dual vertical arm arrangement for raising and lowering the grill. A pair of holding chains are utilized and are connected to a rotatable rod, and the grill is maintained in this position by a gear and tooth arrangement as described above.

Thus, there remains a need for an outdoor barbecue device wherein the grill is readily raised or lowered relative to the fire pit in order to adjust the heat reaching the food on the grill and whereby the grill may be maintained at any desired position along the raising or lowering mechanism in order to provide fine heat adjustment for the food on the grill as well as to remove cooking heat almost entirely on an immediate basis.

SUMMARY OF THE INVENTION

Accordingly, it is one object of the present invention to provide an improved barbecue apparatus.

Another object of the present invention is to provide an outdoor barbecue apparatus having a heat adjustment mechanism permitting fine adjustments of the heat to food being cooked on the apparatus.

Still another object of the present invention is to provide an outdoor barbecue having a grill lift mechanism which permits positioning of the grill at any desired location above the fire pit.

In accordance with the above and other objects and advantages of the present invention, a barbecue apparatus is provided having an enclosure for containing a heat source. The apparatus also includes a mechanism for supporting the enclosure on a surface, and a grill assembly including a grate member disposed over the enclosure. A grill assembly support device includes a pair of substantially vertical arms extending upwardly from opposite sides of the enclosure. A mechanism operatively interconnects the grate member with the vertical arms to guide movement of the grate member along the length of the arms. A rotatable shaft interconnects the vertical arms proximate the upper ends thereof, and a linkage mechanism interconnects the shaft and the grill assembly for selectively raising and lowering the grate relative to the enclosure. Finally, an apparatus is provided for tensioning the shaft and the linkage arrangement relative to the arms to permit selective positioning of the grate at any position along the vertical arms spaced from the enclosure thereby regulating the amount of heat reaching the grate from the heat source in the enclosure.

BRIEF DESCRIPTION OF THE DRAWINGS

The accompanying drawings, which are incorporated herein and form a part of the specification, illustrate preferred embodiments of the present invention and, together with a description, serve to explain the principles present invention. In the drawings.

DETAILED DESCRIPTION OF THE PREFERRED EMBODIMENTS

Figure 1:
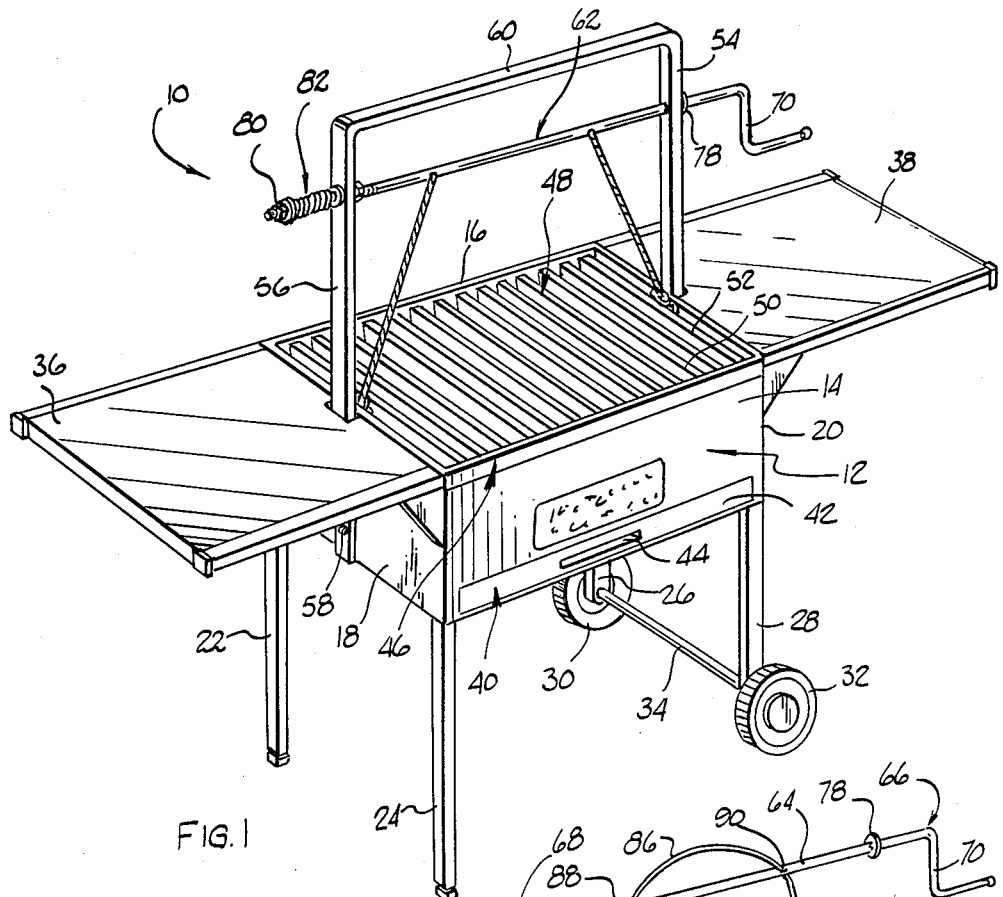
FIG. 1 is a front perspective view of a barbecue apparatus constructed in accordance with the present invention.

Referring first to FIG. 1, a barbecue apparatus 10 is illustrated. The apparatus 10 includes a housing or container 12 having front and rear plates 14, 16 and side members 18, 20. The housing 12 may be constructed from any suitable material which preferably is metal, for example steel or cast iron. The housing 12 is constructed to include a bed for containing the heat source such as a charcoal or wood burning fire pit to be described in more detail below.

The housing 12 is supported on the ground surface by a plurality of leg supports 22, 24, 26 and 28. In a preferred embodiment, the rear leg supports 26, 28 include wheels 30 and 32 mounted to an axle 34 which extends between the ends of the legs 26, 28. In this manner, the front legs 22, 24 may be lifted from the ground surface, and the unit 10 may be easily moved about. The detachable trays 36, 38 may be provided at the sides of the housing 12 and may be secured thereto in any desired conventional way.

In one preferred embodiment of the present invention, a secondary chamber 40 may be provided along the bottom portion of the housing 12 beneath the fire pit. The chamber 40 is accessed by a door 42 having a handle 44. The chamber 40 functions in the capacity of an oven or warming chamber depending on the amount of heat present within the housing 12.

The upper end 46 of the housing 12 is preferably open and includes a grill assembly 48 having a grate member 50 disposed thereon. The grate member 50 includes a plurality of bars 52 aligned substantially parallel to each other and may include cross bars 53 (see FIG. 3) as well. The grate 50 is provided for placement of food to be cooked from heat present within the housing 12.

A pair of upwardly extending, substantially vertical guide rails 54, 56 are positioned on either side of the housing 12. More specifically, the guide rail 54 is attached to plate 18 by attachment bolts 58 and apertures 59, and the guide rail 56 is likewise attached to the end member 20 by a similar type of attachment mechanism. The guide rails 54, 56 extend upwardly from the top portion 46 of the housing 12 and are preferably interconnected at the very upper end by a cross-bar 60 for stability.

Figure 2:
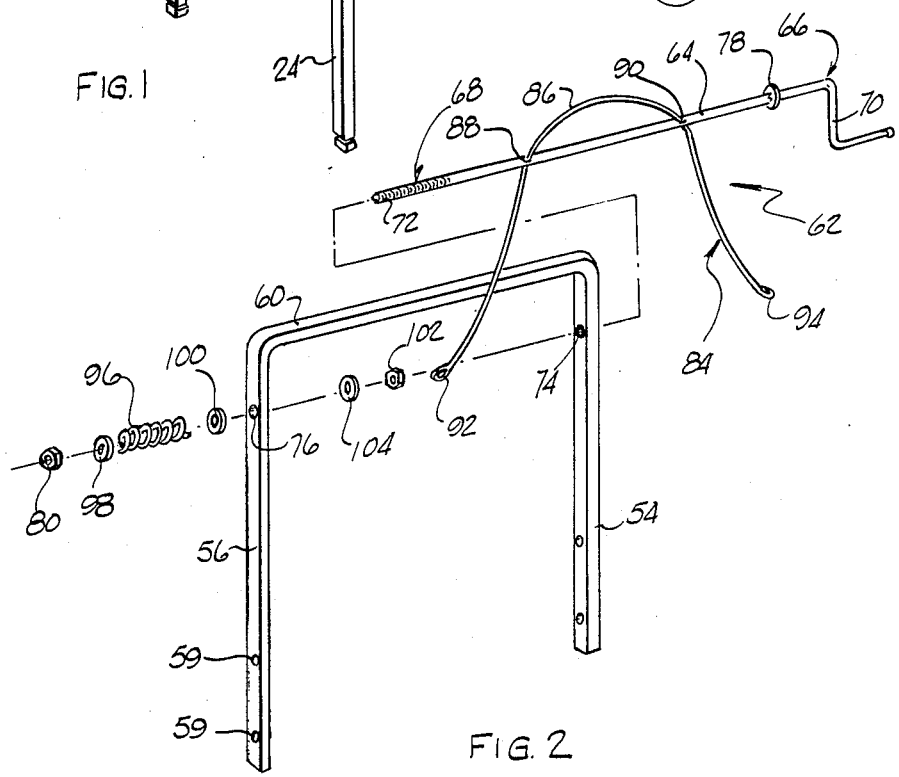
FIG. 2 is an exploded perspective view of the grill lift mechanism of the present invention.
Figure 5:
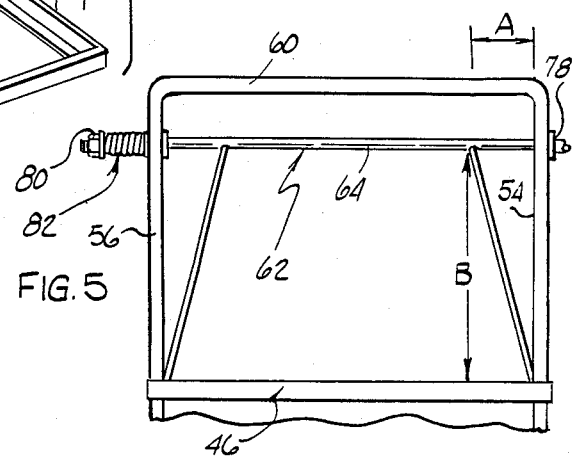
FIG. 5 is a front view of the grill lift mechanism of the present invention.
Figure 6:
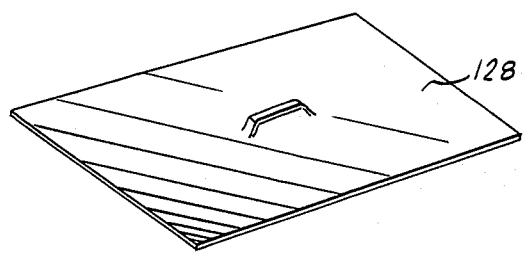
FIG. 6 is a front perspective view of a snuffer member for the fire pit of the present invention.
Figure 7:
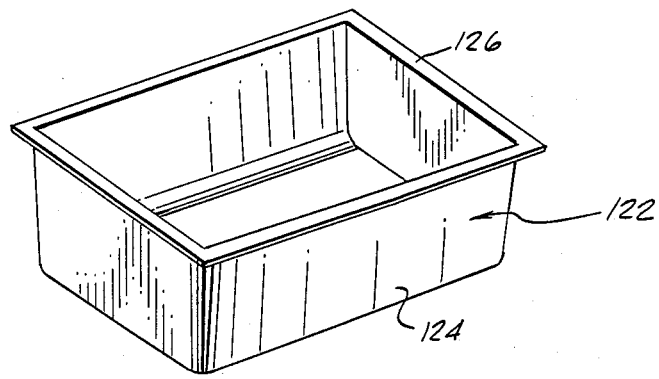
FIG. 7 is a front perspective view of a removable fire pit of the present invention.
Figure 8:
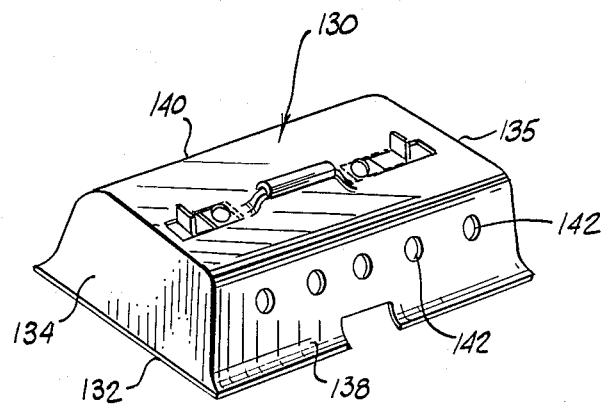
FIG. 8 is a smoker device adaptable for use with the present invention.

Referring in particular to FIGS. 1, 2 and 5, the grill assembly lift mechanism 62 is disclosed. The lift mechanism 62 includes a shaft 64 having a first end 66 and a second end 68. The first end 66 of the shaft 64 includes a crank handle 70 which is utilized to rotate the shaft 64 in position. The second end 68 of the shaft 64 preferably includes threads 72. The shaft 64 is sized and shaped to pass through apertures 74, 76 which are positioned toward the upper end of the guide arms 54, 56. In preferred form, the shaft 64 extends completely through the openings 74, 76 until the end stop member 78 engages the outer surface of the first guide arm 54. The end stop 78 prevents axial movement of the shaft 64 in the direction of the second guide rail 56 beyond engagement of the end stop 78 with the first guide rail 54. A second end stop member 80 is provided at the second end 68 of the shaft 64. In preferred form, however, the end stop member 80 is in the form of a threadable member which is threadably engaged with the threads 72 on the end 68 of the shaft 64. A tensioning mechanism 82 is provided as discussed in detail below.

A connecting linkage 84 extends from the shaft 64 to the grill assembly 48 for attachment to the grill assembly 48. In preferred form, the cable linkage assembly 84 includes a single cable 86 which passes through a pair of apertures 88, 90 disposed in the shaft 64. The apertures 88, 90 are preferably aligned perpendicular to the longitudinal axis of the shaft 64. The ends of the cable 86 preferably include attachment mechanisms such as loop members 92, 94 which are attachable to lift hook mechanisms disposed on the grill assembly 48 to raise and lower the grill assembly 48 as discussed in greater detail below. When the cable 86 is drawn taut due to the weight of the grill assembly 48, the mid-potion of the cable 86 between the apertures 88, 90 lays against and parallel to the shaft 64 between the apertures 88, 90. Thus, as the handle 70 is turned to rotate the shaft 64, the cable 86 winds about the shaft 64. The cable 86 winds about the portions of the shaft 64 between the apertures 88, 90 and the guide rails 54, 56. It is preferred that the spacing of the apertures 88, 90 are such so as to obtain a linear wind about the shaft 64.

Referring in particular to FIG. 5, each aperture is spaced a distance "A" from its adjacent guide rail 54, 56. Likewise, the distance "B" is the distance between the shaft 64 and the surface of the upper portion 46 of the housing 12. The ratio of A/B is preferably in the range 0.20–0.40. If the apertures are placed too close to the guide rails 54, 56, an overwind situation will occur since there is insufficient distance for all of the cable to be linearly wound about the shaft 64 when the grill assembly 48 is raised to its maximum position adjacent the shaft 64. If the apertures are placed too close together and thus too far from the guide rails 54, 56, a non-linear wind will result. Therefore, the most preferred ratio of the distances A/B is ¼ or 0.25. Utilizing the arrangement of the present invention, the only actual attachment of the linkage 84 is to the grill assembly 48, thereby minimizing attachment points between the lift linkage and the shaft and thus minimizing any inherent weakness of the system due to connection points. This is in comparison to prior art designs which utilize direct attachment of the linkage to the shaft which provides additional potential failure or wear points.

Referring to the tension adjustment mechanism 82, it has already been stated above that it is highly desirable to be able to raise the grill assembly 48 to any desired position along the guide rails 54, 56 and then readily leave the grill assembly 48 at that selected position. Fine heat adjustment for the food on the grill 48 may be achievable only if the grill assembly 48 is so positionable at any position along the rails 54, 56. To achieve this, the tension mechanism 82 is provided at end 68. Only one mechanism 82 is needed in the preferred embodiment to permit use of lightweight materials. This mechanism 82 includes a compression spring 96 positioned between the adjustable end stop 80 and the second guide rail 56. A pair of washers 98, 100 are preferably positioned on either side of the spring 96 along shaft end 68. A second adjustable tightening member 102 and washer 104 are provided on the inside surface of the rail 56 to tighten the tension mechanism 82 once the appropriate spring compression is achieved.

Using the tensioning mechanism 82 of the present invention, the end stop member 80 is tightened against the spring 96 to compress the spring 96 between the end stop 80 and the guide rail 56. In so compressing the spring 96, tension is exerted against the shaft 64 to make rotation of the shaft 64 more difficult, although still achievable. Thus, the ability to rotate the shaft 64 and the ease of rotation will be dependent upon the adjustment of the tension mechanism 82. The tension of the mechanism 82 is adjusted so that the shaft 64 may be rotated to any desired position and then the handle 70 released by the operator thereof. Due to the tension created by the mechanism 82, the grill assembly 48 will remain in place with the food thereon.

If larger amounts of weight are placed on the grill assembly 48, the tension of the mechanism 82 may be increased by tightening the nut 80. This arrangement is particularly helpful so as to provide fine heat adjustment to the cooking of any food placed on the grill assembly 48. Moreover, if a chef utilizing the apparatus 10 should be called away from the apparatus 10 while food is on the grill assembly 48, the grill assembly 48 may be simply raised to its maximum height adjacent the shaft 64 and be basically removed from any cooking heat being generated within the housing 12. When the chef returns, the grill assembly 48 may be lowered so as to recommence cooking of the food thereon. In this manner, burning of the food on the grate 50 may be easily prevented when the chef is suddenly called away from the unit 10 while it is use.

Figure 3:
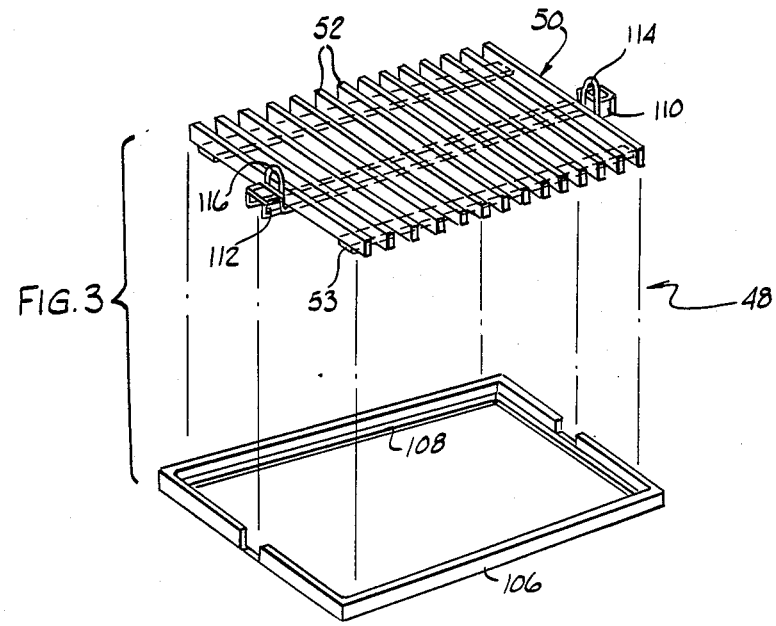
FIG. 3 is an exploded perspective view of one embodiment of the grill assembly of the present invention.
Figure 4:
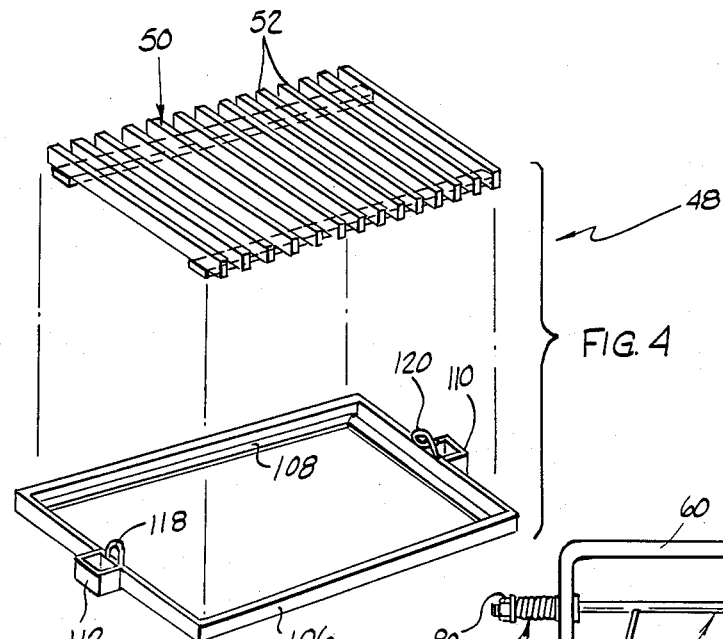
FIG. 4 is a view similar to that of FIG. 3 but illustrating a second embodiment of the grill assembly of the present invention.

Referring now in particular to FIGS. 3 and 4, the grill assembly 48 includes the grate 50 and a grate support bracket 106. The grate support bracket 106 is preferably in the form of a frame which may be positioned about the periphery of the upper end 46 of the housing 12. The support bracket 106 includes an inner ledge or lip 108 about the inner periphery thereof. In this manner, the grate 50 may be placed on the ledge 108 and thus be removably supported by the bracket 106. In one embodiment illustrated in FIG. 3, guide members 110, 112 are provided at each side of the grate 50. The guide members 110, 112 are preferably in the form of brackets which surround the guide rails 54, 56. Attached to the guide members 110, 112 are hook eyelets 114, 116 which are adapted for engaging the ends 92, 94 of the cable 86. Thus, in this embodiment only the grate 50 is raised and lowered relative to the housing 12, the bracket 106 remaining in position at the upper end 46 of the housing 12.

Referring now to FIG. 4, a second embodiment of the grill assembly 48 is illustrated. In this instance, the bracket 106 includes inner lip or ledge 108 upon which the grate 50 is placed. However, the guide members 110 and 112 are attached to the bracket 106 and include cable connectors 118, 120 secured thereto. Thus, in this embodiment, the ends 92, 94 of the cable 86 are attached to the cable connectors 118, 120 so as to raise and lower the bracket 106 and the grate 50 relative to the housing 12. The grate 50 is preferably removable from the frame 106 for ease of cleaning.

Referring to FIGS. 1 and 6–8, a fire pan 122 may be provided. In this instance, the fire pan 122 includes the pan 124 having an outer ledge 126 which extends outwardly from the sides thereof. The ledge 126 engages the upper end 46 of the housing 12 so that the pan 122 may be readily placed within the housing 12. Utilizing this embodiment, an operator of the device 10 may remove the heat source by raising the grill assembly 48 and removing the fire pan 122. A snuffer lid 128 is also optionally provided to cover the pan 122 in order to snuff or extinguish the charcoal or wood heat source within the pan 122 when cooking has been completed. In addition, it is highly desirable that certain foods be smoked during cooking. For this purpose, a smoker lid 130 is provided which includes a peripheral ledge 132 adapted for engaging the perimeter of the grate 50. The smoker lid 130 further includes raised sides 134, 135, a raised front 138, and a raised rear portion 140. The sides 134, 135, front 138 and rear 140 are raised in order to provide space between the grate 50 and the smoker lid 130 for the food being cooked therein. A plurality of apertures 142 are provided to permit smoke to pass therethrough during the course of cooking food on the grate 50.

Figure 9:
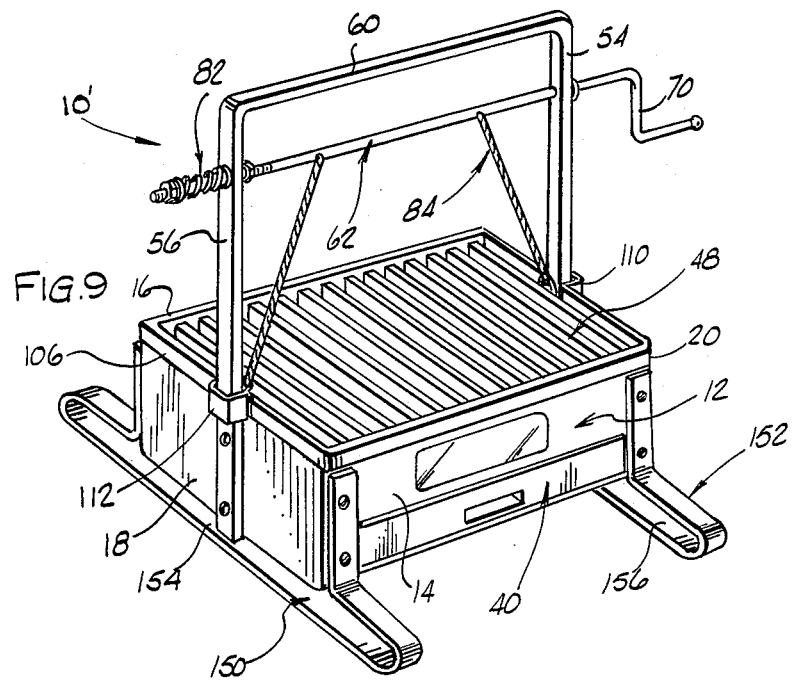
FIG. 9 is a front perspective view of an alternate embodiment of outdoor barbecue apparatus constructed in accordance with the present invention.

Referring to FIG. 9, a portable version of the unit 10' is illustrated. In this instance, like numbers refer to like parts and includes a housing 12 having a front panel 14, a rear panel 16 and side panels 18, 20. An oven or secondary chamber 40 is provided as previously described, and vertical guide arms 54, 56 are mounted to the housing 12 as in the prior embodiment. The lift mechanism 62, the grill assembly 48 and the tension mechanism 82 are all as described in the prior embodiment. In this instance, however, the dimensions are preferably smaller, and the housing 12 is mounted to a pair of legs 150, 152. Each leg 150 and 152 is mounted to the front 14 and the rear 16 of the housing 12 and includes an elongated foot portion 154, 156, respectively. The foot portions 154, 156 are for placement on a table or a ground surface. The grill assembly 48 includes the outer bracket 106 and guide members 112, 114 as illustrated in the FIG. 4 embodiment.

As can be seen from the above, a simple yet unique barbecue apparatus is provided and includes an improved lift mechanism for allowing the grill assembly of the apparatus to be positioned at any selected location above the fire pit of the device. Moreover, a unique tensioning arrangement is provided which permits tension to be adjusted to the device depending on the quantity and weight of the food being cooked on the device, thereby allowing the lift mechanism to be functional regardless of the food being cooked.

The foregoing description and illustrative embodiments of the invention have been shown in the drawings and described in detail in varying modifications and alternate embodiments. It should be understood, however, that the foregoing description of the present invention is exemplary only, and the scope of the present invention is limited only to the claims as interpreted in view of the prior art.

I claim:

1. A barbecue apparatus comprising:
   an enclosure for containing a heat source;
   means for supporting said enclosure on a surface;
   a grill assembly including a grate member disposed over said enclosure;
   grill assembly support means including a pair of substantially vertical arms extending upwardly from opposite sides of said enclosure;
   means operatively interconnecting said grate member with said vertical arms to guide movement of said grate member along the length of said arms;
   a rotatable shaft interconnecting said vertical arms proximate the upper ends thereof;
   linkage means interconnecting said shaft and said grill assembly for selectively raising and lowering said grate relative to said enclosure; and
   means for tensioning said shaft and linkage means relative to said arms to permit selective positioning of said grate at any position along said vertical arms spaced from said enclosure thereby regulating the amount of heat reaching said grate from the heat source in said enclosure.

2. The apparatus as claimed in claim 1, wherein said grill assembly comprises said grate member and grate support bracket disposed for removably supporting said grate member thereon at the upper surface of said enclosure.

3. The apparatus as claimed in claim 2, wherein said grate support bracket comprises a frame and a circumferential ledge extending inwardly from said frame toward the center of said enclosure for supporting the perimeter of said grate.

4. The apparatus as claimed in claim 2, wherein said guide means are attached to said grate to raise and lower said grate relative to the upper surface of said enclosure and said support bracket.

5. The apparatus as claimed in claim 2, wherein said guide means are attached to said support bracket raise and lower said support bracket and grate relative to the upper surface of said enclosure.

6. The apparatus as claimed in claim 1, wherein said shaft includes a handle disposed at a first end thereof, and wherein said linkage means comprises a cable.

7. The apparatus as claimed in claim 6, wherein said cable comprises a single length of cable having its ends removably attachable to said grill assembly proximate said guide means, and wherein said shaft includes a pair of apertures extending therethrough perpendicular to the longitudinal axis thereof, said apertures being spaced inwardly a set distance from said vertical arms with said cable being threaded through said apertures so as to be aligned parallel to the length of said shaft between said apertures.

8. The apparatus as claimed in claim 7, wherein the ratio of the distance between one said aperture and its proximate vertical arm to the distance from said aperture to the plane of the surface of said enclosure ranges from 0.20 to 0.40.

9. The apparatus as claimed in claim 8, wherein said ratio comprises 0.25.

10. The apparatus as claimed in claim 6, wherein said shaft further includes first end stop means positioned proximate said handle at said shaft first end to prevent axial movement of said shaft in one direction, and means for preventing axial movement in the opposite direction including means for creating and selectively adjusting a biasing force between the second, opposite end of said shaft and the vertical arm proximate thereto.

11. The apparatus as claimed in claim 10, wherein said biasing means comprises a second end stop member positioned at the second end of said shaft, a compression spring disposed between said second end stop member and said proximate vertical arm, and means for selectively moving said second end stop member toward and away from said proximate vertical arm to adjust the compression of said spring and therefore adjust the tension on said shaft and said cable.

12. The apparatus as claimed in claim 11, wherein the second end of said shaft is threaded, and wherein said second end stop member comprises a threadable member engageable with the threads of said second end.

13. The apparatus as claimed in claim 1, wherein said enclosure comprises a housing having a peripheral inner lip and a removable fire pan engageable with said lip, said fire pan being adapted for containing said heat source and being selectively removable from said enclosure.

14. The apparatus as claimed in claim 13, wherein said fire pan is constructed for the burning of wood or charcoal therein.

15. The apparatus as claimed in claim 1, wherein said enclosure further includes a secondary chamber disposed at the bottom portion thereof below said heat source, and a door selectively opening to said chamber to permit access thereto, said secondary chamber serving as an oven.

16. A cooking device comprising:
a housing having front, rear and side members;
a pair of upwardly extending guide rails disposed on each side member of said housing;
a grill assembly including a grate for holding eatable material to be cooked;
means operatively interconnecting said grate with said guide rails to stabilize said grate during vertical movement relative to said rails;
a rotatable shaft disposed through each said guide rail for support thereby and including means for maintaining said shaft in its position;
a hoist linkage extending from said shaft to said grill assembly for winding and unwinding on said shaft to raise and lower said grate relative to said housing; and
means for maintaining the position of said shaft at any given rotatable position to permit selective positioning of said grate at any location along said guide rails spaced from said housing to regulate the heat received by eatable food on said grate from a heat source disposed in said housing.

17. The device as claimed in claim 16, wherein said hoist linkage comprises a single cable secured to said shaft at two separate positions thereon and extending from said two positions to said grate stabilization means.

18. The device as claimed in claim 17, wherein said shaft includes a pair of apertures disposed perpendicular to the axis thereof at locations spaced inwardly from said guide rails, said cable being threaded through said apertures so as to extend parallel with said shaft and enable its ends to be connected to said grate stabilization means, the ratio of the distance from one aperture to its closest guide rail to the distance from said aperture to the top of said housing ranging from 0.20–0.40.

19. The device as claimed in claim 18, wherein said ratio comprises 0.25.

20. The device as claimed in claim 17, wherein said grate stabilization means comprises a pair of brackets each surrounding one said guide rail for longitudinal movement therealong.

21. The device as claimed in claim 20, wherein said brackets are secured to said grate at opposite sides thereof and including connecting members for linking to the free ends of said cable.

22. The device as claimed in claim 20, wherein said grill assembly further includes a grill assembly frame sized and shaped to surround the top edges of said housing and including a ledge to hold said grate, and wherein said brackets are secured to said grill assembly frame and include connecting members for attachment to the free ends of said cable to raise and lower said frame and said grate along said rails.

23. The device as claimed in claim 16, wherein said shaft position maintenance means comprises a handle disposed at a first end of said shaft for rotating said shaft, an end stop member disposed at said first end adjacent the outer surface of said guide rail to prevent axial movement of said shaft in one direction, means disposed at a second end of said shaft exterior to the outer surface of the guide rail adjacent thereto for providing a selective bias between said shaft and the guide rail adjacent said second end.

24. The device as claimed in claim 23, wherein said bias means comprising a second end stop member disposed on the very second end of said shaft, a compression spring disposed between said second end stop member and the adjacent guide rail, and means for moving the second end stop member toward or away from the adjacent guide rail to adjust the compression of said spring and thereby adjust the tension created thereby on said shaft and cable to maintain the rotary position of said shaft in any desired location regardless of the food weight placed on said grate.

25. A lift mechanism for a barbecue cooking device having a housing for containing the cooking heat source and including an open top portion, a grate assembly positioned across the open top portion of said housing and including a grate for holding the food to be cooked, and a lift mechanism for raising and lowering the grate relative to said housing, the improvement wherein said lift mechanism comprises:
  a pair of upwardly extending guide arms positioned on each side of said housing;
  a rotatable shaft interconnecting and passing through said guide arms;
  a hoist linkage extending between said rotatable shaft and said grate assembly for raising and lowering said grate assembly relative to said housing;
  means for guiding and stabilizing said grate assembly as it moves along said guide arms; and
  means for maintaining the rotary position of said shaft at any selected position to permit selective positioning of said grate assembly relative to the open top of said housing at any location along said guide arms regardless of the weight of food placed on said grate assembly.

26. The improvement of claim 25, wherein said shaft includes two spaced apertures passing therethrough, and wherein said hoist linkage comprises a single length of cable secured through said two apertures along said shaft and extending to said grate assembly, the free ends of said cable being secured to said guiding and stabilization means proximate said guide arms.

27. The improvement of claim 26, wherein said shaft position maintenance means comprises a handle disposed on a first end of said shaft, a first stop member disposed on the first end of said shaft to prevent axial movement of said handle toward the adjacent first guide arm, and a second end stop member disposed on the second end of said shaft with a compression spring disposed between said second end stop member and the adjacent second guide arm.

28. The improvement of claim 27, wherein said second end stop member is adjustable coaxially along the length of said shaft to increase or decrease the compression of said spring and thereby increase or decrease the tension provided by said position maintenance means necessary to permit selective positioning of said shaft and said grate relative to said guide arms.

* * * * *